United States Patent Office.

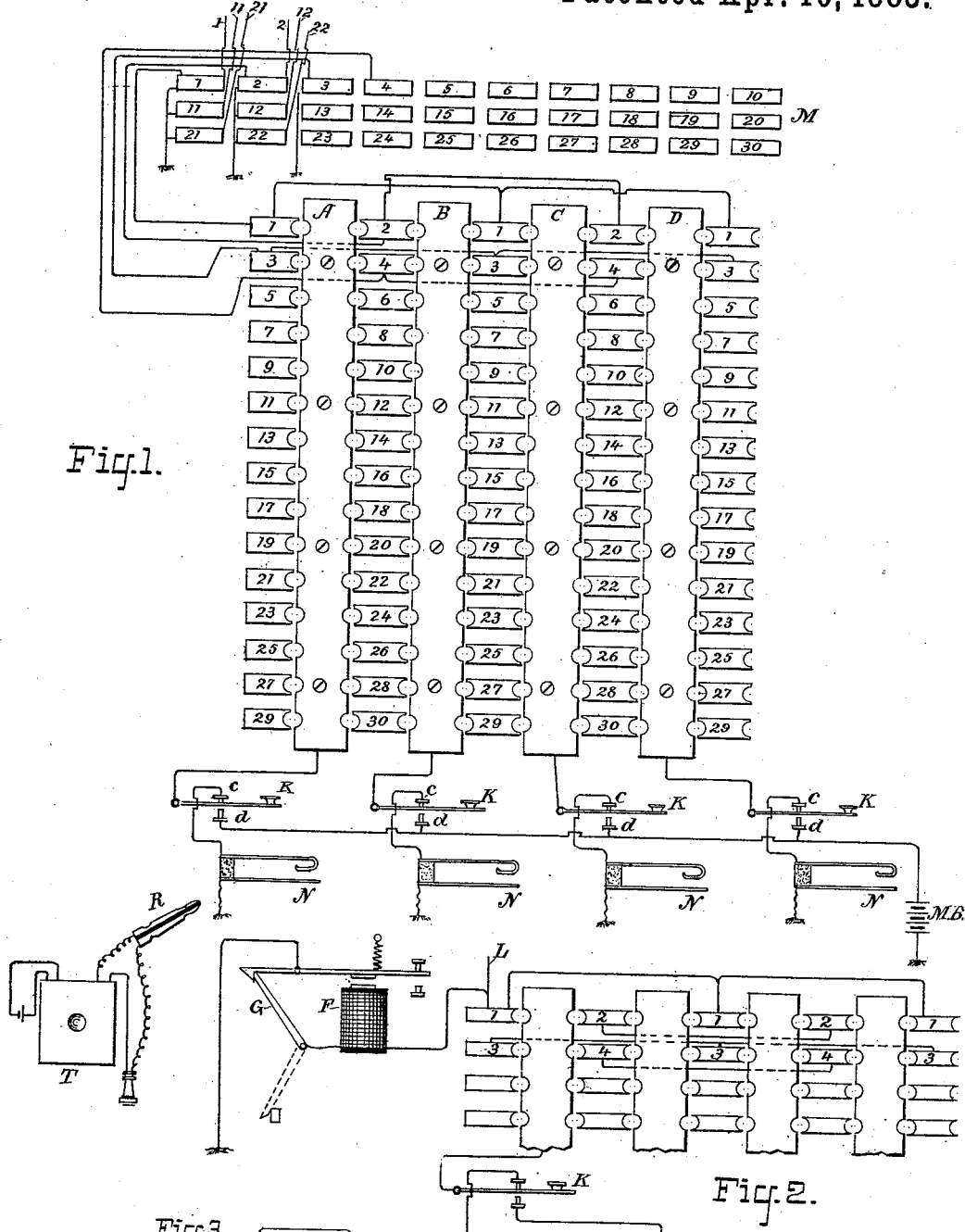

GEORGE W. COY, OF MILFORD, CONNECTICUT, ASSIGNOR OF TWO-THIRDS TO JAMES G. SMITH, OF HACKENSACK, NEW JERSEY, AND CHARLES E. BUELL, OF NEW HAVEN, CONNECTICUT.

TELEPHONE-EXCHANGE SWITCH.

SPECIFICATION forming part of Letters Patent No. 275,362, dated April 10, 1883.

Application filed September 4, 1882. (No model.)

*To all whom it may concern:*

Be it known that I, GEORGE W. COY, a citizen of the United States, and a resident of Milford, in the county of New Haven and State of Connecticut, have invented certain new and useful Improvements in Telephone-Exchange Switches, of which the following is a specification.

My invention relates to the construction of and to the arrangement of connections in the central-office switches of telephone-exchange systems; and its object is to simplify the arrangements and facilitate the work of operating the switch, so as to render it possible to operate a telephone-exchange with a small number of attendants, and at the same time to readily and promptly connect subscribers.

As telephone-exchange switches are ordinarily constructed, the switch-board is divided into sections, upon each of which appear the line-connections of a portion only of the subscribers, the care of such section being assigned to some particular attendant. Instead of dividing the line strips or connections of the switch into sections, I propose to assign to each attendant a particular line-connecting strip or strips, arranged vertically, the number depending upon the work to be done, and to bring the line-connections for all the lines into proximity to all of said line-connecting strips, so that all the wires of the exchange will be under the control of every operator. The annunciators are placed within the view of all the operators, and it is the duty of all to make the connections desired when disengaged. The annunciator being in view of all, any operator can ascertain when any particular line is called for, and whether or not such line is in use. For the purpose of facilitating the working of the exchange, I further propose to place the annunciator-magnet for each line in a branch from the main line to earth, and to pass the circuit to earth through a switch controlled by said annunciator in such a way that when the annunciator is operated, either by a subscriber or by the central-office operator, said branch will be broken, leaving, however, the connection of the line to the switch-board in its normal condition, so that by the manipulation of proper switching devices, to be presently described, the central-office operator may place himself in communication with a subscriber.

My invention also consists in combining with the line-connecting strip for a central-office switch-board a normally-open spring-jack, placed in a connection to earth from such line-connecting strip.

My invention consists, further, in the novel arrangement of line-connecting strips, and of the plates or blocks to which the lines of the exchange are connected, whereby the switch-board is made compact, and is at the same time adapted for use in the manner stated, so that any operator can connect any two lines.

My invention also consists in other combinations of apparatus, that will be specified in the claims.

In the accompanying drawings, Figure 1 is a plan of the switch-board of a telephone-exchange and the connected apparatus arranged according to my invention. Fig. 2 is a detail view. Fig. 3 illustrates a modification in which each main line is normally connected to earth through a battery.

The switch shown is arranged for thirty line-wires, the annunciators for which wires are shown in three tiers at M.

A B C D are four vertical line-connecting strips, embraced on both sides by line blocks or plates numbered from 1 to 30, inclusive, each of which blocks or plates is connected to a correspondingly-numbered line-wire, so that by the insertion of the ordinary switch-plugs at the proper points any two lines may be connected. Said line-plates being arranged symmetrically half on one side and half on the other side of said line-connecting strips, as shown, the line-plates between A and B serve for both of said strips, and, similarly, the plates between C and D serve for both the latter. By this arrangement the number of horizontal rows of line-plates is less by one-half than the number that would be necessary if the plates for all the lines were applied to one side of a strip, the width of the board, however, not being increased. By this arrangement the board is made to occupy less space vertically than would otherwise be necessary.

Connected to each vertical line-connecting strip of the board is a key or switch, K, one of whose contacts, c, is connected to a spring-jack, N, whose two parts are normally disconnected, but which are nevertheless adapted to operate in the ordinary manner in connection with a plug, R, to connect a telephone communicating apparatus, T, into the circuit between the contact c and earth. The other contact, d, of each key or switch is connected to a galvanic battery, M B, a magneto-electric machine, or other suitable device or apparatus for operating the bells or signal devices at subscribers' stations. Each key K is, by preference, a spring-key, and when it is depressed it breaks the connection to the spring-jack at the same time that it connects the battery or other apparatus to the line-connecting strip and the line-wire connected thereto.

The manner in which each line is connected to the switch-board and to its annunciator is shown in Fig. 2, where L indicates the line-wire, joined to the horizontal row of line-plates 1, placed on opposite sides of the alternate line-connecting strips.

F indicates the annunciator-magnet, and G the annunciator card or drop, arranged to be held up by a catch on the armature-lever when the armature is retracted, but to be released and disconnected from the armature when the magnet is energized. The magnet F is in a circuit from the main line to earth through the annunciator-card G and the armature-lever. As soon, however, as the magnet is energized and the card released, the circuit to earth through the card and armature-lever is broken, and remains broken until the annunciator is restored to its normal condition by the ordinary means. In the normal condition of the parts there is no current upon the main line, and the armature is retracted by its spring, so as to hold the annunciator-card up. When the subscriber sends a signal by a magneto-electric machine, battery, or other means, the annunciator-drop falls and shows to the central-office operator the line calling. The circuit to earth being simultaneously broken, the line may now, through any one of the line-strips A B, &c., be connected to any other line. The disconnection of a line from its earth-connection may be also effected by any one of the central-office operators, who for that purpose has only to connect the line-plate for that line to any one of the line-connecting strips, and to depress a key, K, thereby placing battery M B to the line-wire. The current from said battery first flows in the short circuit to earth through the annunciator-magnet, thereby breaking the earth-connection at that point, leaving, however, the other connections intact. The current from said battery then flows to line and gives the ordinary signal at the subscriber's station.

The general operation is as follows: Normally the parts are in the position shown. When a call is received from any line, any one of the operators who is at the time disengaged immediately connects a line-plate of the line calling to any one of the line-connecting strips assigned to him, and, without further manipulation, connects his telephone apparatus with the spring-jack N, and proceeds to obtain from the subscriber calling the party wanted. This he may do without interference from the short or normal earth circuit at the annunciator, that having been broken by the fall of the annunciator-drop. He then connects the line of the party wanted to the same line-connecting strip and depresses the key, thus operating the annunciator of that party's line and automatically disconnecting that line from earth, and proceeds to call him, which having been done, the subscribers can immediately begin their conversation. When conversation has ceased, the annunciators are restored to their normal position in the ordinary way, thus completing the normal earth-connections for the lines. When a call comes from any line for one of two lines already connected, the annunciator will show to the operator answering the call that the desired connection cannot be then had.

Any desired construction of annunciator may be employed, provided the parts be suitably connected and insulated from one another to give the desired path to the current, and to cause the release of the indicator-card or pointer to break the normal connection to earth of the main line.

In practice, any desired number of vertical line-connecting strips may be assigned to each operator, each strip, however, being provided with the key K and the connections to the open spring-jack.

Other forms of switch or of key may be used in place of key K. The form shown and the arrangement of the connections indicated possess the advantages that as soon as the key is released the connection with the open spring-jack is restored, and that when said key is operated the connection to the spring-jack is automatically broken.

It is obvious that the interruption of the normal earth-connection through the branch wire from line might be effected by a separate electro-magnet having mechanism arranged to break the circuit after the manner of the annunciator-drop described, and that the annunciator-magnet might be placed in the main-line circuit to the switch-board.

In order that the automatic circuit-breaker may work effectually both by the action of the incoming and outgoing currents, its magnet should be placed in the branch line.

In the arrangement shown in Fig. 2 the main line is normally connected to earth without passing through a battery, the battery or other generator for operating the annunciator or switch being located at the subscriber's station. Fig. 3 illustrates an arrangement in which the battery is placed at the central office and the switching of the line to the board; or the operation of the annunciator is effected by any suitable device at the subscriber's station adapted to break the main-line circuit.

F' indicates the annunciator and switch-magnet, which is in a branch from the main line L to earth, said branch including in the present case not only the drop G' and its detent, but also a main battery, M B', the effect of which battery is to hold the armature of the electro-magnet F' attracted, so as to prevent the drop G' from falling. When the main-line circuit L is broken at any point, the armature of F' is drawn back by its retractor, thus releasing the drop G' and breaking the normal earth-connection, leaving, however, the line connected to the switch-board.

The parts are restored to their normal position by hand through the intervention of any suitable mechanical devices. For the purpose of allowing the central-office operator to cause the breaking of the branch circuit through the annunciator-drop G' and the main battery M B', any suitable circuit-breaking device—as, for instance, a key, K'—may be interposed in each main-line circuit, or any other suitable mechanical or other means may be employed.

I am aware that it is not new to arrange in a switch-board a series of vertical strips as many in number as there are lines to the exchange, and each forming a line strip or block, in combination with blocks or plates placed beside each strip and forming the terminals for all the lines excepting one which is connected to the strip. Such an arrangement does not accomplish the objects of my invention, since it requires as many vertical strips as lines, while the object of my invention is to secure economy of room and bring the whole exchange within the reach and control of a single operator.

What I claim as my invention is—

1. The combination, in a telephone central-office switch, of a series of vertical strips or bars normally disconnected from the lines and constituting the line-connecting strips of the board, signaling-keys or other apparatus for transmitting signals normally connected to said strips, telephone communicating apparatus provided with means whereby it may be connected with any one of said strips, and line plates or blocks for the subscribers' lines of the exchange, arranged in vertical rows on both sides of each line-connecting strip.

2. The combination, substantially as described, in a telephone central-office switch, of a series of vertical strips or bars normally disconnected from the lines and constituting the line-connecting strips of the switch, line plates or blocks for all the lines arranged in proximity to each vertical strip, and a signaling-key normally connected to each strip.

3. The combination, substantially as described, of a series of subscribers' lines at a central-office switch, each connected to a line plate or block forming normally-open terminals of branches to earth, means for connecting any line through its line-block with a signaling apparatus, and a branch circuit to earth for every line normally closed, and containing an electro-magnet controlling a switch adapted to break such circuit and to retain it in broken condition until the parts are restored to their normal position.

4. The combination, with a series of telephone-lines centering in a single office, of line plates or blocks for every line, arranged in proximity to the line-connecting strips of the board, and a branch to earth from every line, containing an annunciator, said branch including the annunciator drop or indicator and its releasing-detent.

5. The combination, with a series of vertical line-connecting strips, of vertical rows of line blocks or plates, the line blocks or plates on both sides of any strip, combined, representing the lines of the exchange, and signaling-keys normally connected to the various connecting-strips.

6. The combination, with line blocks or plates, arranged on either side of a line-connecting strip, of a branch to earth for every line containing an electro-magnet and automatic switch adapted to break the branch when released by said magnet, and a key and battery connected to said line-connecting strip.

7. The combination, with a series of line-connecting strips, of keys or switches normally connected thereto, one of whose contacts leads to signaling apparatus, while the other or normal contact is connected to a normally-open spring-jack.

8. The combination, with a series of line-connecting strips, each arranged to control all the lines of the exchange, of spring-keys whose normal contact-stops are connected to open spring-jacks, and whose front contacts lead to a galvanic battery, and normally-closed branches from each line containing an electro-magnet and circuit-breaker, adapted to act in the manner described, to break said branch by either an incoming or an outgoing signal.

9. The combination, with a series of subscribers' lines connected to a common switch-board, the line blocks or plates of which form the terminals of normally-open earth branches, of branches to earth from each line, containing electro-magnets and automatic switches, adapted to break said branch, in the manner described.

10. The combination, with a series of lines terminating in line plates, blocks, or strips, of branches to earth, each containing an electro-magnet and circuit-breaker, and means for connecting any line to a galvanic battery, whereby the normal earth-connection may be broken by either an incoming or an outgoing signal.

11. The combination, with line-connecting strips, of normally-open spring-jacks normally connected to said strips, and a pair of divided conducting-plates, adapted for insertion between the two surfaces of any spring-jack.

12. The combination, with a series of subscribers' lines terminating in a switch-board whose line blocks or plates form the terminals of normally-open earth-branches, of means for connecting said lines through the switch-board with telephone communicating apparatus, and electro-magnets and circuit-breakers in normally-closed branches to earth for the various lines.

13. In a telephone-exchange switch, the combination, with a series of vertical strips or plates normally disconnected from the lines so as to constitute the "line-connecting strips" of the board, signaling apparatus normally connected to each strip, and line blocks or plates for all the wires of the switch or section of switch, arranged on the two sides of each strip.

Signed at New York, in the county of New York and State of New York, this 24th day of August, A. D. 1882.

GEORGE W. COY.

Witnesses:
 THOS. TOOMEY,
 H. C. TOWNSEND.